UNITED STATES PATENT OFFICE.

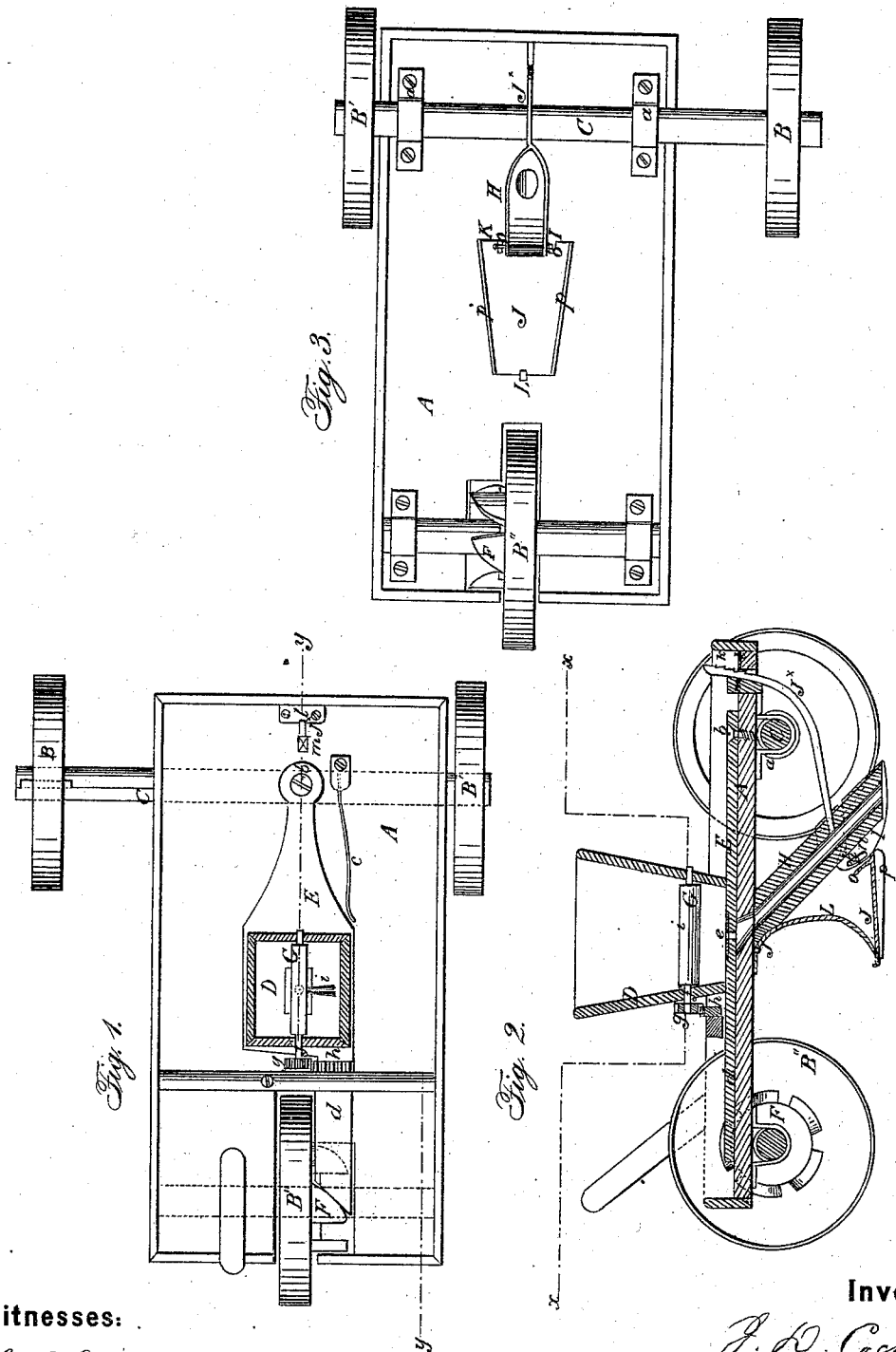

J. D. COCHRAN, OF MILFORD, NEW HAMPSHIRE.

IMPROVEMENT IN SEEDING-MACHINES.

Specification forming part of Letters Patent No. 54,506, dated May 8, 1866.

*To all whom it may concern:*

Be it known that I, J. D. COCHRAN, of Milford, in the county of Hillsborough and State of New Hampshire, have invented a new and Improved Seeding-Machine; and I do hereby declare that the following is a full, clear, and exact description thereof, which will enable others skilled in the art to make and use the same, reference being had to the accompanying drawings, forming part of this specification, in which—

Figure 1 is a horizontal section of my invention, taken in the line $x\,x$, Fig. 2; Fig. 2, a side sectional view of the same, taken in the line $y\,y$, Fig. 1; Fig. 3, an inverted plan of the same.

Similar letters of reference indicate like parts.

This invention relates to a new and improved machine for planting seed in drills; and it consists in the employment or use of a vibrating hopper in connection with a cut-off fitted on a rock-shaft and operated automatically from the hopper, as hereinafter fully shown and described.

The invention further consists in an adjustable seed-conveying spout and coverer, whereby proper furrows may be made to receive the seed, and the latter suitably covered and the earth compacted upon it.

A represents a bed, [of rectangular form, mounted upon three wheels, B B' B'', the latter being at the rear of the bed, while the other two, B B', are on an axle, C, fitted in bearings $a$, secured to the under side of the front part of the bed, the wheels being secured on the axle and the latter allowed to turn in its bearings. The wheel B is adjustable on the axle C—that is to say, may be moved nearer to or farther from the bed A, and be made to serve as a guide to insure the drills being made at uniform and proper distances apart.

D is a hopper placed on the bed A and attached to a plate, E, which works on a pivot, $b$, passing through the front part of the bed A. This plate E has a spring, $c$, bearing against one side of it, and this spring has a tendency to keep the rear end of the plate E on an arm, $d$, connected thereto, in contact with a cam, F, attached concentrically to the rear wheel, B''.

In the bottom of the hopper D there is a hole, $e$, and in said hopper there is placed a horizontal shaft, G, the rear journal, $f$, of which passes through the rear side of the hopper and has a pinion, $g$, upon it, which gears into a stationary rack, $h$, attached to bed A.

The shaft G has a brush, $i$, extending from it, the brush being sufficiently long to touch, when in a vertical position, the bottom of the hopper.

H represents a seed-conveying spout, the upper end of which is connected by a hinge, $j$, to the bottom of the bed A, the upper end of the spout H being in line with the hole $e$.

A furrow-opener or share, I, is secured to the lower end of spout H, and the spout may be adjusted to a greater or less angle or degree of inclination by means of a covered bar, J^, which is toothed at its upper part to form a rack, $k$, at its front edge, and passes through a slot in the bed A, any one of the teeth engaging with a plate, $l$, at the front part of the slot and retained by a key, $m$, as shown in Fig. 2.

The rear part of the share I extends beyond the spout H, and is slotted at each side, as shown at $n$ in Fig. 2, said slots being of oblong curved form; and J is a coverer, having ears $o\,o$ at its front end, through which ears and the slots $n\,n$ a pin, K, passes.

L is a spring, which bears upon the rear part of the coverer J, as shown clearly in Fig. 2, and has a tendency to keep it in contact with the earth and to cover the seed by filling up the furrow made by the share I.

The coverer J may be described as formed of a flat plate, gradually decreasing in width from its front to its rear end, and having a pendent flange, $p$, at each side.

The hopper D is supplied with the requisite quantity of seed, and as the machine is drawn along the hopper is vibrated laterally by the spring $c$ and cam F, and as said hopper is moved the rock-shaft G is turned, moved first in one direction and then in the other, through the medium of the pinion $g$ and stationary rack $h$, and the brush $i$ is made to work over the hole $e$, the brush covering the hole when the hopper is moved over the spout H, so as to prevent any more seed from dropping into spout H than the hole $e$ contains. By this arrangement the seed cannot choke or clog up the hopper, the vibratory movement of the latter, in connection with the cut-off brush, effectually preventing such a contingency.

The spout H may be adjusted to regulate the depth of the furrow as may be required, and the coverer J is allowed to conform perfectly to the inequalities of surface over which it may pass.

Having thus described my invention, what I claim as new, and desire to secure by Letters Patent, is—

1. The vibrating hopper D, placed on the pivoted plate E, and operated through the medium of the cam F and spring c, substantially as and for the purpose set forth.

2. The oscillating cut-off brush i, in combination with the vibrating hopper D, all arranged to operate substantially as and for the purpose specified.

3. The adjustable seed-conveying spout H, substantially as and for the purpose set forth.

4. The coverer J, attached to the rear of the share I, and having the spring L applied to it, substantially as shown and described.

JOHN D. COCHRAN.

Witnesses:
F. T. SAWYER,
O. A. HAMBLETT.